United States Patent
Hutchison et al.

(10) Patent No.: US 10,890,357 B2
(45) Date of Patent: Jan. 12, 2021

(54) WATER HEATER WITH SELF-CENTERING BOTTOM COVER

(71) Applicant: Haier US Appliance Solutions, Inc., Wilmington, DE (US)

(72) Inventors: Gregory L. Hutchison, Shelbyville, KY (US); Neil Kent McDonald, Georgetown, IN (US); Timothy David Gantt, Goshen, KY (US); Jonathan D. Nelson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 221 days.

(21) Appl. No.: 16/037,215

(22) Filed: Jul. 17, 2018

(65) Prior Publication Data

US 2020/0025414 A1    Jan. 23, 2020

(51) Int. Cl.
*F24H 9/02*     (2006.01)
*B23P 19/04*    (2006.01)

(52) U.S. Cl.
CPC ............... *F24H 9/02* (2013.01); *B23P 19/04* (2013.01)

(58) Field of Classification Search
CPC ........................................................ F24H 9/02
See application file for complete search history.

(56) References Cited

U.S. PATENT DOCUMENTS

| | | | | |
|---|---|---|---|---|
| 3,722,732 A | * | 3/1973 | Edlund | B65D 15/14 220/623 |
| 4,452,226 A | * | 6/1984 | Daugirda | F24H 9/06 122/19.2 |
| 5,180,077 A | | 1/1993 | Lewis | |
| 5,924,392 A | * | 7/1999 | Hall | F24H 1/182 122/494 |
| 6,267,261 B1 | * | 7/2001 | Lesage | F24H 1/182 220/567.3 |
| D452,903 S | * | 1/2002 | Whitsitt | D23/322 |
| 6,588,378 B1 | * | 7/2003 | Henderson | F24H 1/182 122/19.2 |
| 9,222,697 B2 | * | 12/2015 | Rodriguez | F24H 1/181 |
| 9,541,304 B2 | | 1/2017 | Rissler et al. | |

FOREIGN PATENT DOCUMENTS

CN           104422129 B      3/2017

* cited by examiner

*Primary Examiner* — Nathaniel Herzfeld
(74) *Attorney, Agent, or Firm* — Dority & Manning, P.A.

(57) ABSTRACT

A water heater appliance is provided that includes features that facilitate centering a tank within a casing of the water heater while also diminishing heat loss through the bottom of the water heater. More particularly, a water heater is provided that includes a bottom cover that has an integral centering feature that facilitates centering of the tank within the casing. A method for assembling a water heater appliance is also provided.

18 Claims, 7 Drawing Sheets

WATER HEATER WITH SELF-CENTERING BOTTOM COVER

FIELD OF THE INVENTION

The subject matter of the present disclosure relates generally to water heater appliances.

BACKGROUND OF THE INVENTION

Water heaters provide for the heating and storage of water for various uses. A heat source is provided for raising the temperature of water in a water tank. The heat energy may be supplied e.g., by gas burners, electrically-resistant coils, or a heat pump using a refrigerant cycle. Typically, the water tank is surrounded by a wrapper and is insulated to prevent the water stowed within the water tank from heat loss before use.

Generally, it is desirable to center the water tank within the wrapper. To center the water tank within the wrapper, some conventional water heaters include a plastic ring to space the tank from a bottom cover and to act as a thermal break and also include a foam ring to keep the tank centered in the bottom cover. Requiring a ring as a thermal break and a separate ring as a centering element to center and position the tank adds extra manufacturing cost to the water heater, such as added costs to make and assemble the water heater with a second ring. Moreover, some conventional water heaters include a single centering ring. While such water heaters cut down on the number of rings, such single centering rings typically have complex geometries and thus are difficult to manufacture. Furthermore, such single centering rings typically extend radially from the water tank to the wrapper. Thus, foamed-in insulation cannot extend to the base of the bottom cover. Thus, heat may escape along the bottom portion of the water heater where no foamed-in insulation is present.

Accordingly, a water heater appliance and a method for assembly thereof that address one or more challenges noted above would be useful.

BRIEF DESCRIPTION OF THE INVENTION

Aspects and advantages of the invention will be set forth in part in the following description, or may be apparent from the description, or may be learned through practice of the invention.

In one exemplary embodiment, a water heater appliance is provided. The water heater appliance defines a vertical direction, a centerline axis extending along the vertical direction, and a radial direction extending to and from the centerline axis. The water heater appliance includes a tank having a tank bottom, the tank defining a chamber for heating water. The water heater appliance also includes a heating source in thermal communication with the tank for selectively heating water within the chamber. Moreover, the water heater appliance includes a support ring onto which the tank bottom is positioned. In addition, the water heater appliance includes a wrapper surrounding at least a portion of the tank, the wrapper having a bottom opening. The water heater appliance also includes a bottom cover onto which the support ring is positioned. The bottom cover is positioned at the bottom opening of the wrapper to close off the bottom opening. Further, the bottom cover has a base and a centering feature projecting from the base along the vertical direction. The centering feature is positioned inward of the support ring along the radial direction.

In another exemplary embodiment, a method for assembling a water heater appliance is provided. The water heater appliance defines a vertical direction, a centerline axis, and a radial direction extending to and from the centerline axis. The method includes assembling a wrapper with a bottom cover to form at least a part of a casing. The method also includes attaching a support ring formed of a thermally insulating material to a bottom edge of a tank to form a tank assembly. Moreover, the method includes inserting the tank assembly into the casing. When the tank assembly is inserted into the casing, a centering feature projecting from a base of the bottom cover along the vertical direction centers the tank assembly within the casing such that the support ring of the tank assembly is positioned onto the base of the bottom cover outward of the centering feature along the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
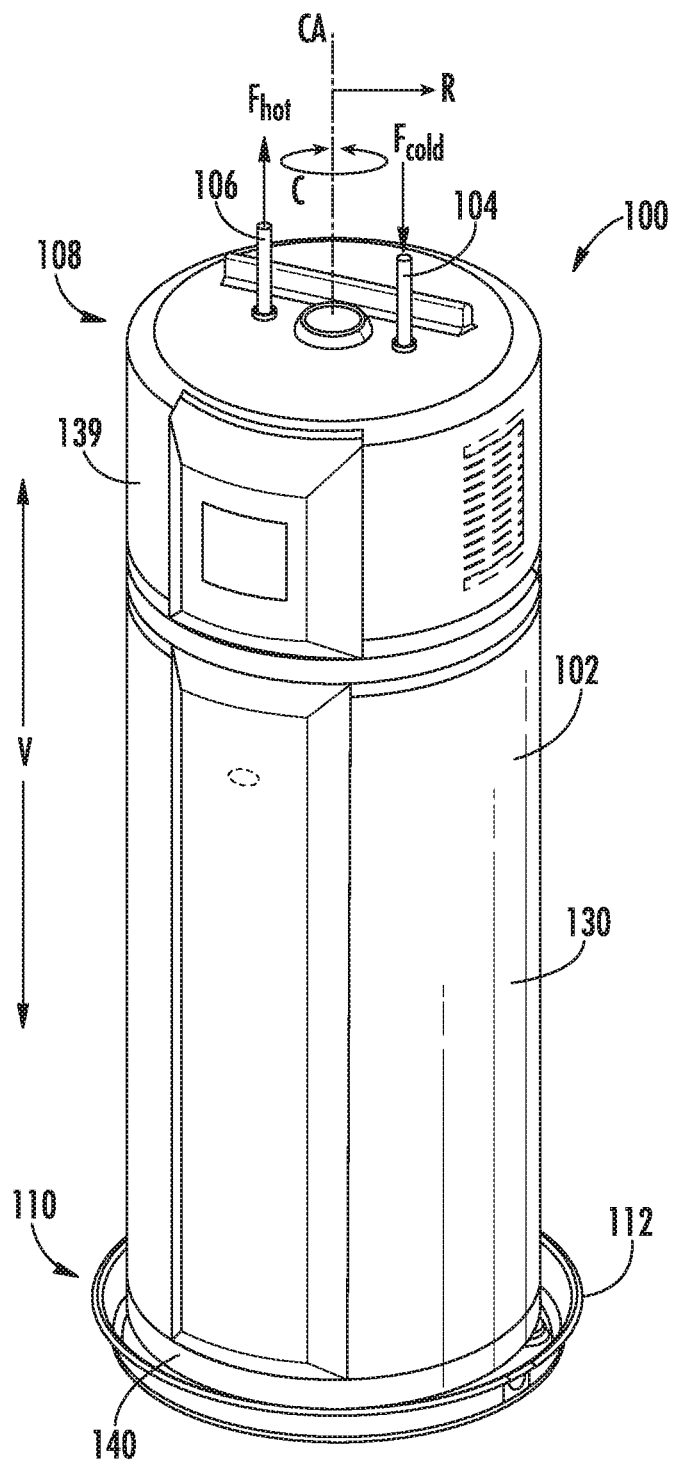
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error.

FIG. 1 provides a perspective view of a water heater appliance 100 according to an exemplary embodiment of the present subject matter. Water heater appliance 100 includes a casing 102 that generally surrounds a tank 120 (FIG. 2) and may be formed from a variety of components. As illustrated, casing 102 may include a wrapper or jacket 130 and one or more covers, such as a top cover 139 and a bottom cover 140. The covers may be coupled to wrapper 130 to form casing 102. Wrapper 130 surrounds at least a portion of tank 120.

Figure 2:
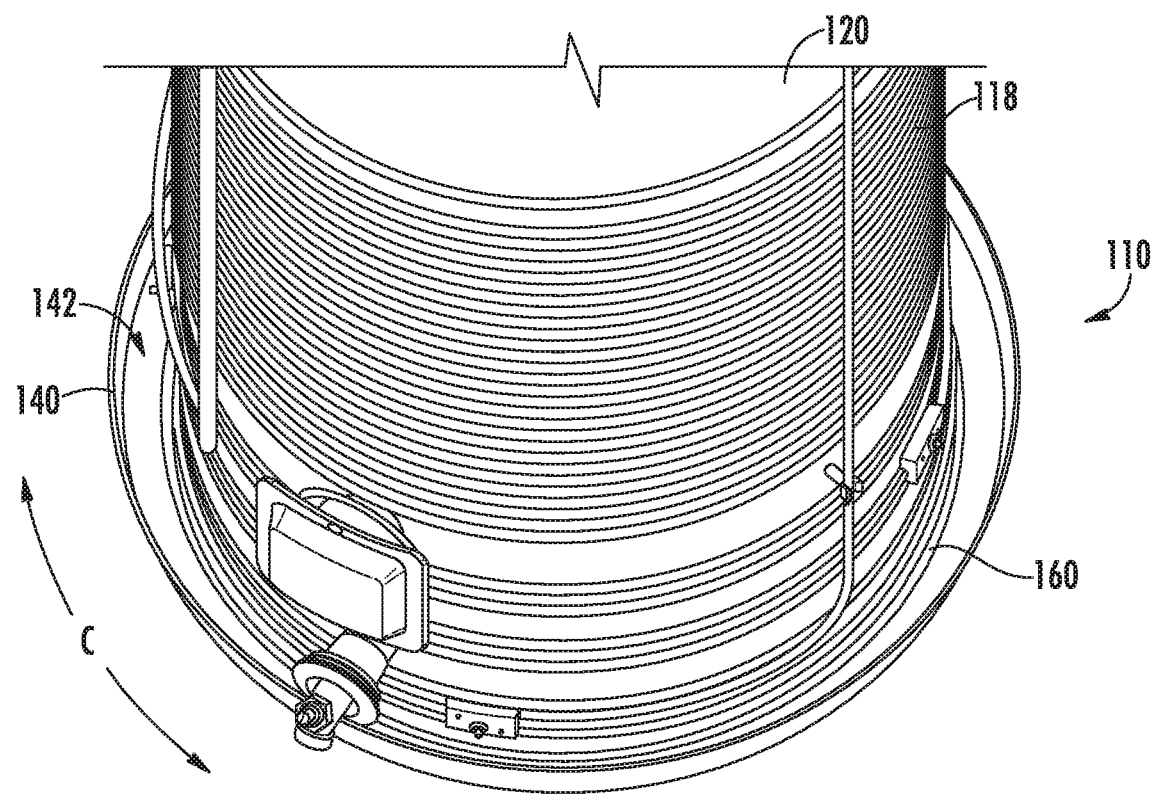
FIG. 2 provides a perspective view of a bottom portion of the exemplary water heater appliance of FIG. 1 with the wrapper of the water heater removed.

Water heater appliance 100 also includes a cold water conduit 104 and a hot water conduit 106 that are both in fluid communication with a chamber 122 (FIG. 3) defined by tank 120. As an example, cold water from a water source, e.g., a municipal water supply or a well, can enter water heater appliance 100 through cold water conduit 104 (shown schematically with arrow labeled $F_{cold}$). From cold water conduit 104, such cold water can enter chamber 122 of tank 120 wherein it is selectively heated by a heating source, e.g., hot refrigerant circulating through coils 118 (FIG. 2). Such heated water can exit water heater appliance 100 at hot water conduit 106 (shown schematically with arrow labeled $F_{hot}$) and, e.g., be supplied to a bath, shower, sink, or any other suitable feature.

Water heater appliance 100 defines a vertical direction V. Water heater appliance 100 extends between a top portion 108 and a bottom portion 110 along the vertical direction V. Thus, water heater appliance 100 is generally vertically oriented. Water heater appliance 100 can be leveled, e.g., such that casing 102 is plumb in the vertical direction V, to facilitate proper operation of water heater appliance 100. A drain pan 112 is positioned at bottom portion 110 of water heater appliance 100 such that water heater appliance 100 sits on drain pan 112. Drain pan 112 sits beneath water heater appliance 100 along the vertical direction V, e.g., to collect water that condenses on an evaporator (not shown) of water heater appliance 100. Further, for reference, water heater appliance 100 also defines a centerline axis CA. For this embodiment, the centerline axis CA extends along the vertical direction V. Moreover, for reference, water heater appliance 100 defines a radial direction R extending to and from the centerline axis CA in a plane orthogonal to the vertical direction V and a circumferential direction C extending three hundred sixty degrees (360°) around the centerline axis CA.

FIG. 2 provides a perspective view of bottom portion 110 of water heater appliance 100 with wrapper 130 removed. As noted above, tank 120 is configured for storing heated water. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances. Tank 120 may have a generally cylindrically-shaped body 124 (FIG. 3) that extends vertically between a tank bottom 126 (FIG. 3) and a top (not shown). For this exemplary embodiment, water heater appliance 100 is shown as a refrigerant based heat pump water heater that circulates hot refrigerant through coils 118 to transfer heat to water in tank 120. However, the present subject matter is not limited to heat pump water heaters. As will be understood by one of skill in the art using the teachings disclosed herein, the present invention may also be used with, e.g., water heaters that rely upon electric resistance heating elements, gas burners, and/or other heat sources as well.

Figure 3:
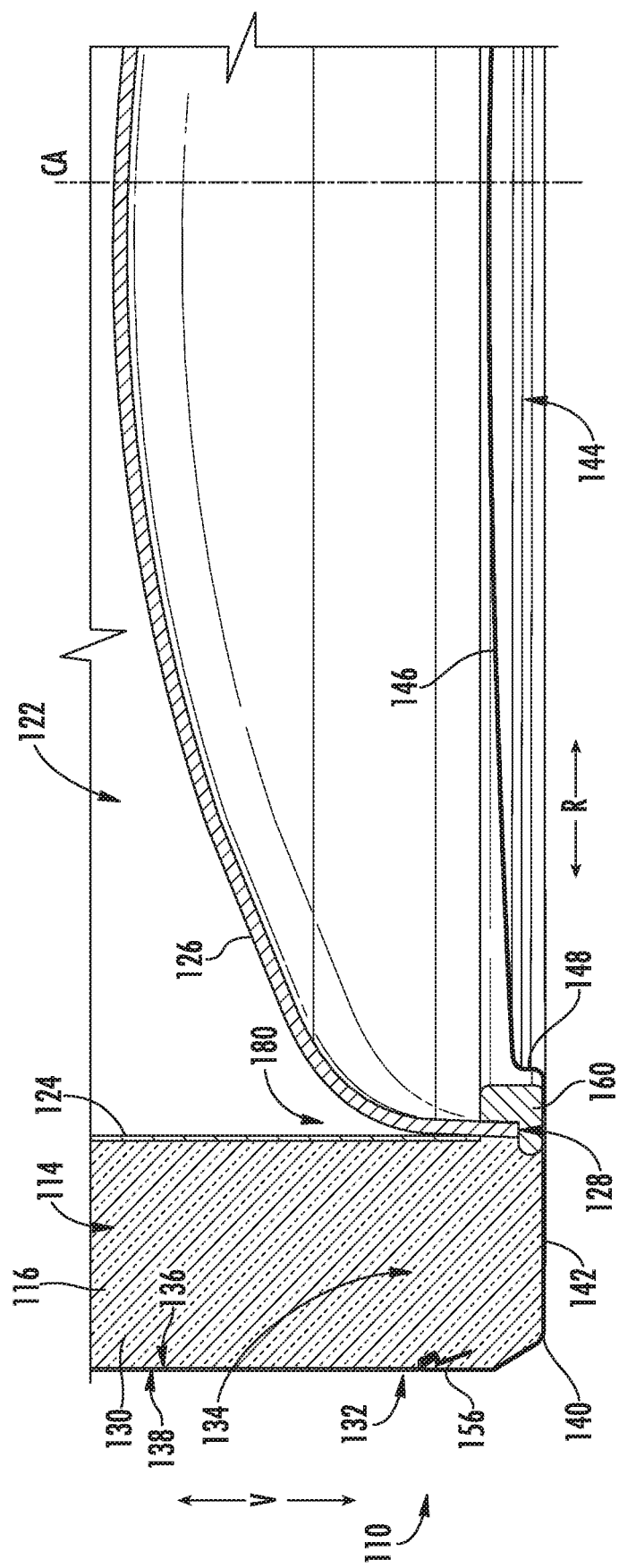
FIG. 3 provides a cross-sectional view of the exemplary water heater appliance of FIG. 1.

FIG. 3 provides a close up, cross-sectional view of water heater appliance 100. As shown, wrapper 130 extends generally along the vertical direction V between a top edge (not shown) and a bottom edge 132. When assembled, the top edge may, for example, be proximate top portion 108 of water heater appliance 100 (FIG. 1), and bottom edge 132 may, for example, be proximate bottom portion 110 of water heater appliance 100. Wrapper 130 defines a bottom opening 134 through which tank 120 is received. Bottom cover 140 is positioned at bottom opening 134 to close off opening 134.

Wrapper 130 may be a generally tubular, hollow component and in exemplary embodiments may be generally cylindrical. An interior of casing 102 may be at least partially defined by wrapper 130, such as by an inner surface 136 of wrapper 130. An outer surface 138 of wrapper 130 may be opposite inner surface 136. An annular cavity 114 is defined between casing 102 (FIG. 1) and tank 120. As shown in FIG. 3, annular cavity 114 is defined between wrapper 130/bottom cover 140 and tank 120. Insulation 116, such as an expanding foam insulation, is provided within annular cavity 114 to reduce the amount of heat transfer to the environment. Insulation 116 can be provided as foamed-in insulation but other materials may be used as well. Notably, the expanding foam insulation 116 provided in annular cavity 114 expands to a base 142 of bottom cover 140 and substantially along the radial length of base 142. In this way, heat transfer is reduced through the very bottom of water heater appliance 100.

It is desirable to properly center and align tank 120 within wrapper 130, or more generally casing 102. In this way, various features may be aligned, such as e.g., heating element ports, drain ports, temperature pressure ports, conduits 104, 106. Moreover, by properly centering tank 120 within wrapper, insulation 116 may have a more uniform radial thickness, among other benefits. Accordingly, in accordance with exemplary aspects of the present subject matter, water heater appliance 100 includes various features that facilitate centering of tank 120 within casing 102. Such features are explained below.

As further shown in FIG. 3, water heater appliance 100 includes a support ring 160 onto which tank bottom 126 is positioned or seated. Support ring 160 provides a thermal barrier or shunt between the relatively warm tank 120 and bottom cover 140. Support ring 160 also prevents the metal tank 120 from contacting or damaging bottom cover 140, e.g., when tank 120 is positioned onto cover bottom 140. Additionally, support ring 160 also prevents insulation 116 from seeping or leaking radially inward beneath tank 120, e.g., when insulation 116 is blown into or otherwise provided to annular cavity 114 during assembly. In some embodiments, support ring 160 may include one or more crush ribs that deform under the weight of tank 120 when tank 120 is positioned on support ring 160. The crush ribs may facilitate proper contact and sealing between tank 120 and support ring 160. In some embodiments, support ring 160 is formed of a compliant, thermally insulating material. For instance, support ring 160 may be formed of an Expanded Polystyrene (EPS) material. In other embodiments, however, support ring 160 may be formed of other suitable materials. Support ring 160 may be formed by an extrusion process, a molding process, an additive manufacturing process, or any other suitable process.

Figure 4:
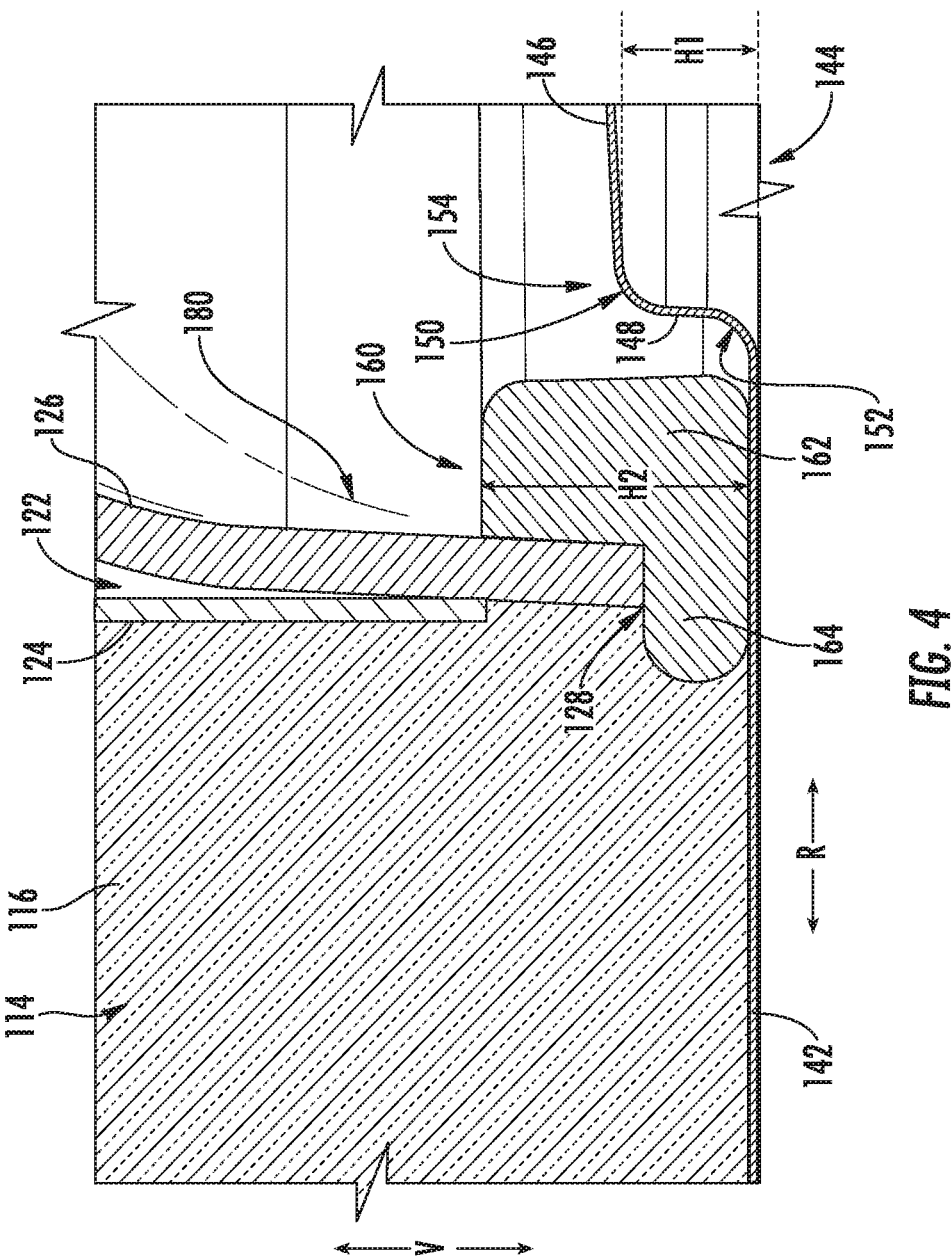
FIG. 4 provides a close up, cross-sectional view of the exemplary water heater appliance of FIG. 1.

FIG. 4 provides a close up, cross-sectional view of water heater appliance 100 further detailing certain features thereof. As shown, for this embodiment, support ring 160 includes a ring body 162 and a flange 164 projecting outward from ring body 162 along the radial direction R. As shown, a bottom edge 128 of tank bottom 126 is positioned on flange 164 of support ring 160 and is supported along its inner diameter by ring body 162. In some alternative embodiments, flange 164 may project inward from ring body 162 along the radial direction R. In such embodiments, tank bottom 126 is positioned on flange 164 and is supported along its outer diameter by ring body 162. In yet other embodiments, support ring 160 defines a pocket in which tank bottom 126 is positioned or received. In such embodiments, an inner portion of support ring 160 may support the inner diameter of tank bottom 126 and an outer portion of support ring 160 may support the outer diameter of tank bottom 126. A base connecting the inner and outer portions may support tank bottom 126 along the vertical direction V.

In some exemplary embodiments, support ring 160 is attached to tank 120, or more particularly tank bottom 126. For instance, support ring 160 may be attached to tank 120 to form a tank assembly 180. In some embodiments, to assemble water heater appliance 100, tank 120 and support ring 160 (i.e., tank assembly 180) may be lowered into casing as a single assembly and centered as will be explained in detail herein. Support ring 160 may be attached or connected to tank 120 in any suitable fashion. For instance, in some embodiments, support ring 160 is attached to tank 120 by an interference fit. For example, support ring 160 may be pressed onto tank 120. In other embodiments, support ring 160 is attached to tank 120 by an adhesive. In yet other embodiments, support ring 160 is attached to tank 120 by an interference fit and an adhesive. Other suitable ways of attaching or connecting support ring 160 to or with tank 120 are contemplated.

Figure 5:
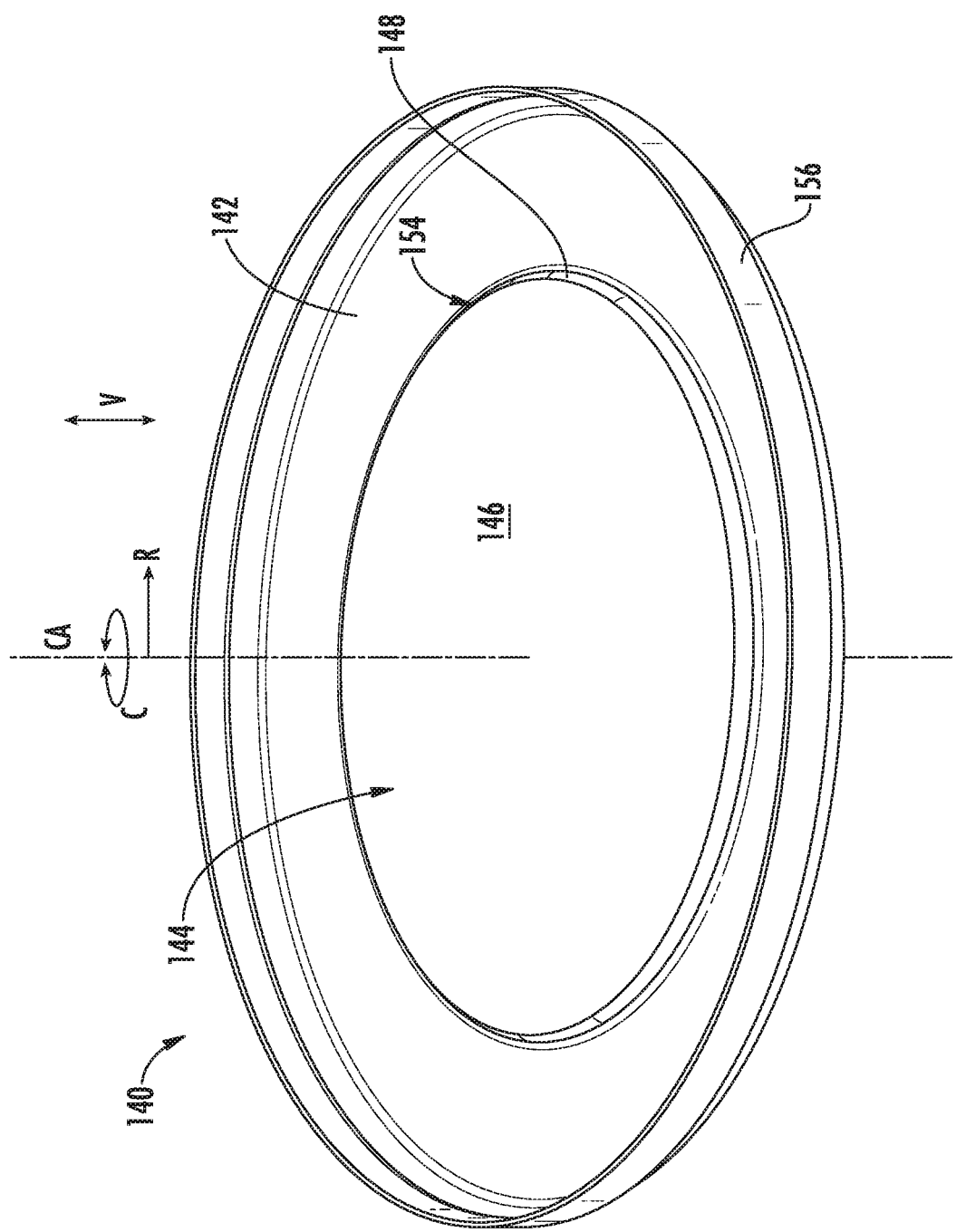
FIG. 5 provides a perspective view of a bottom cover of the exemplary water heater appliance of FIG. 1.
Figure 6:
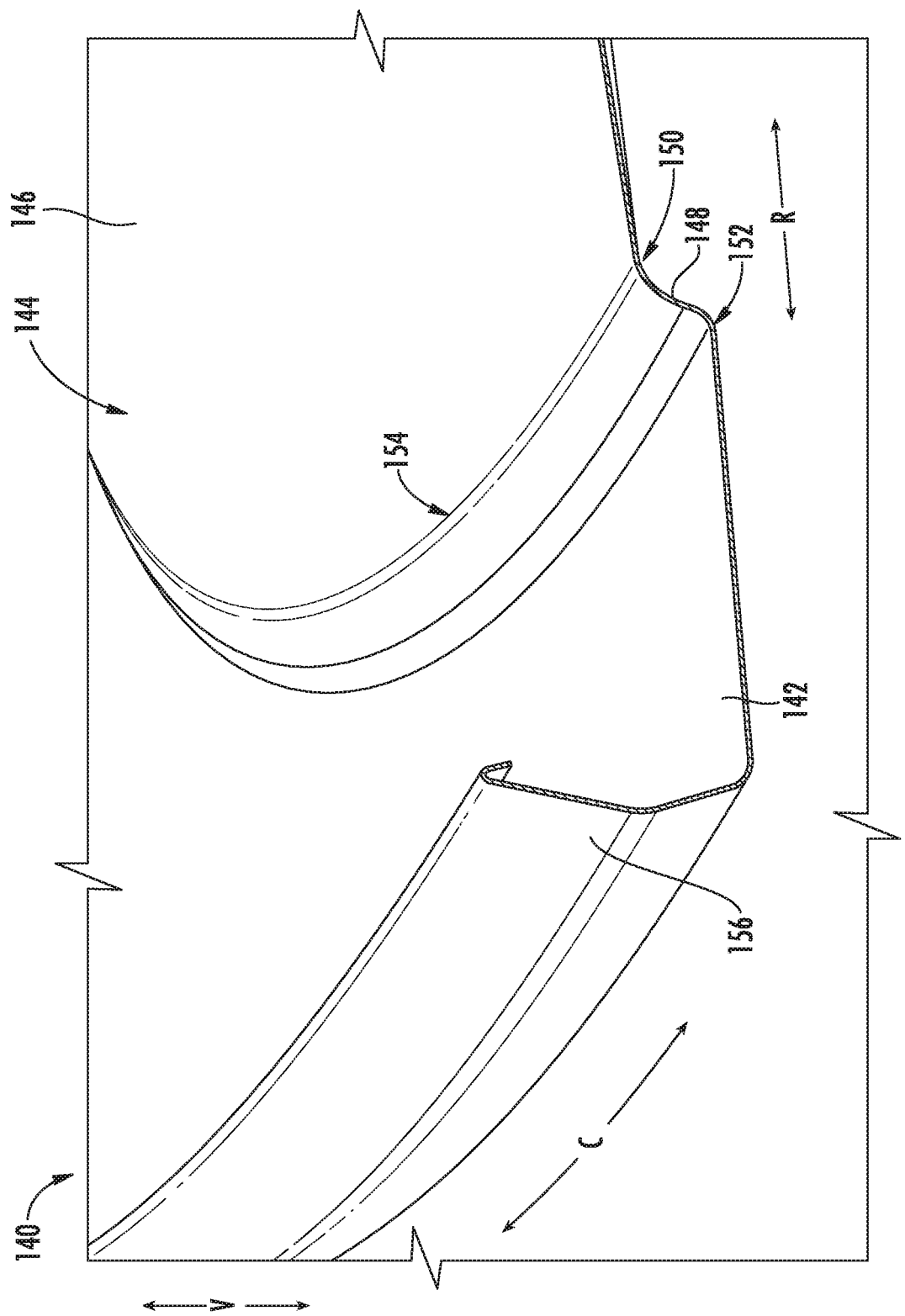
FIG. 6 provides a close up, perspective cross-sectional view of the bottom cover of FIG. 5.

With reference now to FIGS. 3, 4, 5, and 6, features of bottom cover 140 will now be described. FIG. 5 provides a perspective view of bottom cover 140 and FIG. 6 provides a close up, perspective cross-sectional view of bottom cover 140. As shown, bottom cover 140 includes base 142 that is generally flat and configured to contact the ground below water heater appliance 100 (or as shown in FIG. 1, base 142 may be positioned onto drain pan 112). Bottom cover 140 has an outer wall 156 projecting from base 142 along the vertical direction V. Specifically, outer wall 156 projects upward from base 142 along the vertical direction V at the outer periphery of base 142 of bottom cover 140. Outer wall 156 connects or couples bottom cover 140 to wrapper 130 to form a portion of casing 102 (FIG. 1), e.g., as shown best in FIG. 3. When tank 120 is centered within casing 102, support ring 160 is positioned on bottom cover 140 as shown best in FIGS. 3 and 4. Particularly, support ring 160 is positioned on base 142 of bottom cover 140. Bottom cover 140 may be formed of a suitable material, such as e.g., metal.

Bottom cover 140 of water heater appliance 100 also includes a centering feature 144. Generally, centering feature 144 facilitates centering and alignment of tank 120 (or tank assembly 180) within casing 102. As shown, centering feature 144 projects from base 142 along the vertical direction V. Particularly, centering feature 144 projects from base 142 upward along the vertical direction V (i.e., in a direction toward top portion 108 (FIG. 1) of water heater appliance 100). Base 142 extends annularly between outer wall 156 and centering feature 144. For this embodiment, centering feature 144 is integrally formed with base 142 as a single monolithic piece. As one example, centering feature 144 may be stamped into bottom cover 140. As another example, centering feature 144 may be printed via an additive manufacturing process with base 142. Moreover, as shown best in FIGS. 3 and 4, when tank assembly 180 is centered within casing 102 (FIG. 1), centering feature 144 is positioned inward of support ring 160 along the radial direction R. That is, centering feature 144 is positioned radially inward of support ring 160 when tank assembly 180 (i.e., support ring 160 and tank 120) is centered within casing 102.

For this embodiment, centering feature 144 has an elliptical cone shape (as shown best in FIGS. 3 and 5). As shown best in FIGS. 4, 5, and 6, centering feature 144 of bottom cover 140 has an upper base 146 and a sidewall 148 connecting upper base 146 and base 142 of bottom cover 140. Upper base 146 forms the upper portion of the elliptical cone shape. Sidewall 148 extends annularly about upper base 146, e.g., along the circumferential direction C. The curved or arcuate shape of upper base 146 discourages unstable metal buckling or oil canning due to handling and thermal environments.

As shown best in FIGS. 4 and 6, centering feature 144 has an upper rounded edge 150 transitioning upper base 146 and sidewall 148. Centering feature 144 also has a lower rounded edge 152 transitioning sidewall 148 and base 142 of bottom cover 140. For this embodiment, upper rounded edge 150 is convex and lower rounded edge 152 is concave. Upper rounded edge 150 facilitates centering of tank assembly 180 within casing 102 and prevents support ring 160 from being damaged during a centering operation. For instance, in embodiments where tank assembly 180 is lowered into casing 102 and seated on bottom cover 140, if tank assembly 180 is off-center and support ring 160 is positioned on top of centering feature 144, upper rounded edge 150 allows an operator or machine to center tank assembly 180 into position on base 142 in a less abrupt manner, e.g., by allowing support ring 160 to gradually move or slide off of the centering feature 144 and into position on base 142. Moreover, upper rounded edge 150 provides haptic feedback to the operator or machine that the edge or outer periphery 154 of centering feature 144 is near when centering tank assembly 180. Lower rounded edge 152 also facilitates centering of tank assembly 180 within casing 102. For instance, lower rounded edge 152 may also allow an operator or machine to center tank assembly 180 into position in a less abrupt manner, e.g., by allowing the support ring 160 to slide into position and onto base 142.

Notably, as shown best in FIG. 4, at least a portion of sidewall 148 of centering feature 144 extends substantially parallel with the vertical direction V. In some embodiments, at least a portion of sidewall 148 extends parallel with the vertical direction V. Vertically extending sidewall 148 provides a relatively abrupt elevation differential between upper base 146 and base 142. In this way, centering of tank 120 within casing 102 (FIG. 1) may be facilitated. For instance, as noted above, when a machine or operator is centering tank assembly 180 within casing 102, the machine or operator will receive haptic feedback when tank assembly 180 is slid or centered into position with respect to centering feature 144. More particularly, the machine or operator will sense or feel the vertical adjustment of support ring 160 being slid off upper base 146 and downward onto base 142.

With reference still to FIG. 4, in some embodiments, upper base 146 of centering feature 144 defines outer periphery 154. Further, as shown, centering feature 144 has a height H1 at outer periphery 154 that extends between upper base 146 and base 142 along the vertical direction V. Further, support ring 160 has a height H2. In such embodiments, the height H1 of centering feature 144 at outer periphery 154 is greater than half the height H2 of the support ring 160. Such a height H1 or elevation differential between upper base 146 and base 142 has been found to provide a machine or operator with responsive haptic feedback.

With reference generally to FIGS. 1 through 7, water heater appliance 100 may be centered within casing 102 in the following exemplary manner. Wrapper 130 may first be assembled with bottom cover 140. For instance, in FIG. 3 wrapper 130 and bottom cover 140 are shown coupled together to form at least a part of casing 102. Top cover 139 may be assembled with wrapper 130 at top portion 108 at a later stage of assembly. An interior volume is defined by wrapper 130 and bottom cover 140 when they are coupled together. The interior volume is sized to receive tank assembly 180, or support ring 160 attached to tank bottom 126 of tank 120. As noted above, support ring 160 may be attached to tank bottom 126 in any suitable manner, e.g., by an interference fit. Tank assembly 180 may be inserted or lowered into the interior volume defined by casing 102. When tank assembly 180 is fully lowered or inserted into casing 102, support ring 160 serves as a frictional interface between the relatively sharp bottom edge 128 of tank bottom 126 and the sloped metal centering feature 144 of bottom cover 140 thus allowing for a slip fit centering to occur. In some instances, a portion of support ring 160 may initially contact upper base 146 of centering feature 144. To center tank 120 within casing 102, an operator or machine may push or slide tank assembly 180 into position such that the full annulus of support ring 160 is positioned onto base 142 of bottom cover 140. As noted previously, upper rounded edge 150 and lower rounded edge 152 may facilitate positioning of support ring 160 relative to centering feature 144. Moreover, the vertical elevation differential or height difference between upper base 146 and base 142 may provide a user or machine with haptic feedback when tank assembly 180 is moved or slid off upper base 146 and onto base 142. After tank assembly 180 is centered within casing 102, as facilitated by centering feature 144 of bottom cover 140, assembly of water heater appliance 100 may be completed. For example, as will be explained further below, insulation 116 may be provided or blown into annular cavity 114 and top cover 139 may be coupled with wrapper 130 to complete the assembly of water heater appliance 100.

Figure 7:
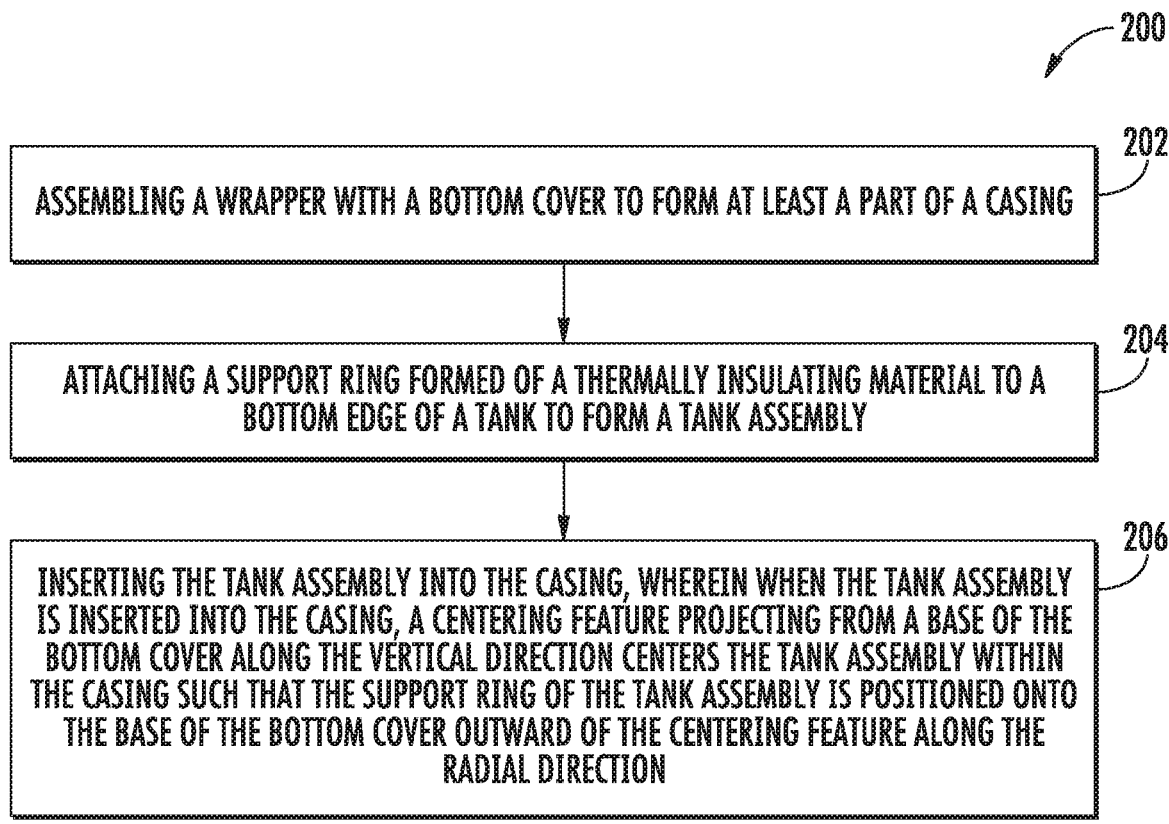
FIG. 7 provides a flow diagram for an exemplary method according to an exemplary embodiment of the present subject matter.

FIG. 7 provides a flow diagram of an exemplary method (200) for assembling a water heater appliance according to exemplary embodiments of the present subject matter. For instance, the method (200) can be used to assemble the water heater appliance 100 described herein. To provide context to exemplary method (200), the reference numerals used in FIGS. 1 through 6 to describe the features of water heater appliance 100 will be used below. It will be appreciated, however, that method (200) is not limited in scope to assembling water heater appliance 100; rather, method (200) is applicable to other suitable types and models of water heater appliances.

At (202), method (200) includes assembling a wrapper with a bottom cover to form at least a part of a casing. For instance, wrapper 130 may be coupled to or connected with bottom cover 140 to form part of casing 102. When wrapper 130 is assembled with bottom cover 140, the resultant casing 102 defines an interior volume.

At (204), method (200) includes attaching a support ring formed of a thermally insulating material to a bottom edge of a tank to form a tank assembly. For instance, support ring 160 may be attached to bottom edge 128 of tank 120 to form tank assembly 180. Support ring 160 may be formed of any suitable thermally insulating material. For example, support ring may be formed of an EPS material. Further, support ring 160 may be attached to bottom edge 128 of tank 120 in any suitable fashion. For example, support ring 160 may be attached to bottom edge 128 via an interference fit. As another example, support ring 160 may be attached to bottom edge 128 of tank 120 via an adhesive. In some implementations, support ring 160 is attached to bottom edge 128 of tank bottom 126 via an interference fit and an adhesive. To facilitate attachment of support ring 160 to bottom edge 128 of tank bottom 126, tank 120 may be suspended vertically in the air, e.g., by a hoist, and support ring 160 may be pressed onto bottom edge 128 of tank bottom 126. Thus, in such implementations, support ring 160 is assembled attached to tank bottom 126 outside of or not within the interior volume of casing 102.

At (206), method (200) includes inserting the tank assembly into the casing. For instance, tank assembly 180 may be inserted into casing 102, or more particularly, the interior volume defined by casing 102. As one example, tank assembly 180, which includes tank 120 and support ring 160 attached thereto, maybe lowered into the interior volume defined by casing 102 by a hoist. When tank assembly 180 is fully inserted into casing 102, tank assembly 180 contacts bottom cover 140 of casing 102. Notably, support ring 160 may be attached to bottom edge 128 of tank bottom 126 such that support ring 160 is positioned between tank bottom 126 and bottom cover 140, e.g., as shown in FIG. 4. In this way, when tank assembly 180 is fully inserted into casing 102, support ring 160 contacts bottom cover 140 thus preventing metal on metal contact (i.e., preventing metal tank bottom 126 from contacting metal bottom cover 140).

In such implementations of method (200), when the tank assembly is inserted into the casing, a centering feature projecting from a base of the bottom cover along the vertical direction centers the tank assembly within the casing such that the support ring of the tank assembly is positioned onto the base of the bottom cover outward of the centering feature along the radial direction. For instance, when tank assembly 180 is inserted into casing 102, centering feature 144 projecting from base 142 of bottom cover 140 along the vertical direction V centers tank assembly 180 within casing 102. Tank assembly 180 is centered within casing 102 such that support ring 160 of tank assembly 180 is positioned onto base 142 of bottom cover 140 outward of centering feature 144 along the radial direction R, e.g. shown in FIG. 4.

Centering feature 144 of bottom cover 140 facilitates centering of tank assembly 180 in casing 102 by providing haptic feedback to a user or machine positioning tank assembly 180 within casing 102. In some implementations, for example, centering feature has an upper base and a sidewall connecting the upper base and the base of the bottom cover. In such implementations, at least a portion of the sidewall of the centering feature extends substantially parallel with the vertical direction. For instance, centering feature 144 may include upper base 146 that is elevated vertically above base 142 along the vertical direction V. Sidewall 148 connects upper base 146 with base 142 of bottom cover 140. As shown best in FIG. 4, at least a portion of sidewall 148 extends substantially parallel with the vertical direction V. Thus, when a machine or operator is inserting tank assembly 180 into the interior volume of casing 102, if tank assembly 180 is not properly centered within casing 102, as the operator or machine moves the tank assembly 180 the machine or operator will receive haptic feedback when tank assembly 180 is slid or centered into position with respect to centering feature 144. More particularly, the machine or operator will sense or feel the vertical adjustment of support ring 160 being slid off and downward onto base 142 from upper base 146. Vertically extending sidewall 148 provides the relatively abrupt elevation differential between upper base 146 and base 142.

In some implementations, after tank assembly 180 is inserted into casing 102 and centered, method (200) includes inserting an expanding foam insulation into an annular cavity defined between the casing and the tank assembly. In such implementations, when the expanding foam insulation is inserted the annular cavity, the expanding foam insulation expands to a base of the bottom cover. For instance, as shown best in FIG. 3, insulation 116, which in this implementation is expanding foam insulation (which may be in liquid form when inserted), may be inserted or blown into annular cavity 114 defined between casing 102 and tank assembly 180. Further, as shown, insulation 116 expands to base 142 of bottom cover 140. Accordingly, bottom portion 110 of water heater appliance 100 may have improved thermal performance and structural integrity due to insulation 166 extending all the way to base 142 of bottom cover 140, e.g., compared to a water heater appliance that does not have any insulation in this area or another material with less desirable thermal and structural properties, such as EPS. In some implementations, when the expanding foam insulation is inserted the annular cavity, the expanding foam insulation expands substantially along a portion of the base that is positioned outward of the support ring along the radial direction R. For instance, as shown best in FIG. 3, insulation 116 expands substantially along base 142 that is positioned radially outward of support ring 160 along the radial direction R. In this implementation, insulation 116 expands substantially along the entire radial length of the portion of base 142 that is positioned radially outward of support ring 160. Thus, as shown, insulation 116 fills substantially all of annular cavity 114, providing water heater appliance 100 with advantageous thermal performance and structural integrity.

In some implementations, method (200) further includes attaching a top cover to the wrapper to form the casing. For instance, after insulation is inserted or blown into annular cavity 114, top cover 139 may be connected or coupled to a top edge of wrapper 130 shown in FIG. 1 to form the remaining portion of casing 102.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A water heater appliance defining a vertical direction, a centerline axis extending along the vertical direction, and a radial direction extending to and from the centerline axis, the water heater appliance comprising:
a tank having a tank bottom, the tank defining a chamber for heating water;
a heating source in thermal communication with the tank for selectively heating water within the chamber;
a support ring onto which the tank bottom is positioned;
a wrapper surrounding at least a portion of the tank, the wrapper having a bottom opening; and
a bottom cover onto which the support ring is positioned, the bottom cover positioned at the bottom opening of the wrapper to close off the bottom opening, the bottom cover having a base, an outer wall projecting from the base along the vertical direction, and a centering feature projecting from the base along the vertical direction, wherein the centering feature is positioned inward of the support ring along the radial direction, and
wherein the centering feature has an upper base and a sidewall connecting the upper base and the base of the bottom cover, the bottom cover defining a radius extending from the outer wall to the centerline axis along the radial direction, the sidewall being positioned outward of a midpoint of the radius along the radial direction, and wherein the sidewall of the centering feature provides an abrupt elevation differential between the upper base of the centering feature and the base of the bottom cover so that haptic feedback is received when the tank is slid or centered into position with respect to the centering feature.

2. The water heater appliance of claim 1, wherein the centering feature projects from the base upward along the vertical direction.

3. The water heater appliance of claim 1, wherein the centering feature has an upper rounded edge transitioning the upper base and the sidewall.

4. The water heater appliance of claim 1, wherein the centering feature has a lower rounded edge transitioning the sidewall and the base of the bottom cover.

5. The water heater appliance of claim 1, wherein at least a portion of the sidewall of the centering feature extends substantially parallel with the vertical direction.

6. The water heater appliance of claim 1, wherein the centering feature has an upper rounded edge transitioning the upper base and the sidewall and a lower rounded edge transitioning the sidewall and the base of the bottom cover.

7. The water heater appliance of claim 1, wherein the upper base of the centering feature defines an outer periphery, and wherein a height of the centering feature at the outer periphery extends between the upper base and the base along the vertical direction, and wherein the height of the centering feature at the outer periphery is greater than half of a height of the support ring.

8. The water heater appliance of claim 1, wherein the centering feature has an elliptical cone shape.

9. The water heater appliance of claim 1, wherein the base extends annularly between the outer wall and the centering feature.

10. The water heater appliance of claim 1, wherein the support ring is formed of a compliant, thermally insulating material.

11. The water heater appliance of claim 1, wherein the support ring has a ring body and a flange projecting outward from the ring body along the radial direction, and wherein the tank bottom is positioned on the flange of the support ring.

12. The water heater appliance of claim 1, wherein the support ring is attached to the tank bottom by an interference fit.

13. A method for assembling a water heater appliance defining a vertical direction, a centerline axis, and a radial direction extending to and from the centerline axis, the method comprising:
assembling a wrapper with a bottom cover to form at least a part of a casing;
attaching a support ring formed of a thermally insulating material to a bottom edge of a tank to form a tank assembly;
inserting the tank assembly into the casing; and
wherein when the tank assembly is inserted into the casing, a centering feature projecting from a base of the bottom cover along the vertical direction centers the tank assembly within the casing such that the support ring of the tank assembly is positioned onto the base of the bottom cover outward of the centering feature along the radial direction, and wherein an outer wall projects from the base along the vertical direction, and wherein the centering feature has an upper base and a sidewall connecting the upper base and the base of the bottom cover, the bottom cover defining a radius extending from the outer wall to the centerline axis along the radial direction, the sidewall being positioned outward of a midpoint of the radius along the radial direction, and wherein the sidewall of the centering feature provides an abrupt elevation differential between the upper base of the centering feature and the base of the bottom cover so that haptic feedback is received when the tank is slid or centered into position with respect to the centering feature.

14. The method of claim 13, further comprising:

inserting an expanding foam insulation into an annular cavity defined between the casing and the tank assembly, wherein when the expanding foam insulation is inserted into the annular cavity, the expanding foam insulation expands to a base of the bottom cover.

15. The method of claim 14, wherein when the expanding foam insulation is inserted the annular cavity, the expanding foam insulation expands substantially along a portion of the base that is positioned outward of the support ring along the radial direction.

16. The method of claim 13, further comprising:

attaching a top cover to the wrapper to form the casing.

17. The method of claim 13, wherein at least a portion of the sidewall of the centering feature extends substantially parallel with the vertical direction.

18. A water heater appliance defining a vertical direction, a centerline axis extending along the vertical direction, and a radial direction extending to and from the centerline axis, the water heater appliance comprising:

a tank having a tank bottom, the tank defining a chamber for heating water;

a heating source in thermal communication with the tank for selectively heating water within the chamber;

a support ring onto which the tank bottom is positioned;

a wrapper surrounding at least a portion of the tank, the wrapper having a bottom opening; and a bottom cover onto which the support ring is positioned, the bottom cover positioned at the bottom opening of the wrapper to close off the bottom opening, the bottom cover having a base, an outer wall projecting from the base along the vertical direction, and a centering feature projecting from the base along the vertical direction, wherein the centering feature is positioned inward of the support ring along the radial direction, and wherein the centering feature has an upper base and a sidewall connecting the upper base and the base of the bottom cover, at least a portion of the sidewall extending substantially parallel with the vertical direction, the bottom cover defining a radius extending from the outer wall to the centerline axis along the radial direction, the sidewall being positioned outward of a midpoint of the radius along the radial direction, and wherein the sidewall of the centering feature provides an abrupt elevation differential between the upper base of the centering feature and the base of the bottom cover so that haptic feedback is received when the tank is slid or centered into position with respect to the centering feature.

* * * * *